US012693772B2

(12) United States Patent
Nagai et al.

(10) Patent No.: US 12,693,772 B2
(45) Date of Patent: Jul. 28, 2026

(54) VIEWER FOR ANALYSIS, DISPLAY SYSTEM, DISPLAY METHOD, AND DISPLAY PROGRAM

(71) Applicants: Shimadzu Corporation, Kyoto (JP); SUMITOMO RUBBER INDUSTRIES, LTD., Kobe (JP)

(72) Inventors: Shiori Nagai, Kyoto (JP); Tomohiro Kawase, Kyoto (JP); Satoshi Yamamoto, Kyoto (JP); Hiroaki Yamada, Kobe (JP); Wakana Ito, Kobe (JP); Masashi Fukuchi, Kobe (JP); Yuma Unno, Kobe (JP)

(73) Assignees: SHIMADZU CORPORATION, Kyoto (JP); SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/922,442

(22) PCT Filed: Mar. 8, 2021

(86) PCT No.: PCT/JP2021/008901
§ 371 (c)(1),
(2) Date: Oct. 31, 2022

(87) PCT Pub. No.: WO2021/220617
PCT Pub. Date: Nov. 4, 2021

(65) Prior Publication Data
US 2023/0195279 A1     Jun. 22, 2023

(30) Foreign Application Priority Data
Apr. 30, 2020     (JP) ................................. 2020-080347

(51) Int. Cl.
G06F 3/0482     (2013.01)
G06F 3/0484     (2022.01)

(52) U.S. Cl.
CPC .......... *G06F 3/0482* (2013.01); *G06F 3/0484* (2013.01)

(58) Field of Classification Search
CPC ............................. G06F 3/0482; G06F 3/0484
See application file for complete search history.

(56) References Cited

U.S. PATENT DOCUMENTS

| | | | |
|---|---|---|---|
| 9,075,043 B2 | 7/2015 | Mizumoto et al. | |
| 2007/0101273 A1* | 5/2007 | Lin ........................ | G16C 20/80 715/781 |

(Continued)

FOREIGN PATENT DOCUMENTS

| | | |
|---|---|---|
| JP | 2006-162487 A | 6/2006 |
| JP | 2007-078508 A | 3/2007 |

(Continued)

OTHER PUBLICATIONS

Office Action dated Oct. 31, 2023 for corresponding Japanese Patent Application No. 2022-517527.

(Continued)

*Primary Examiner* — Stephen S Hong
*Assistant Examiner* — Darrin Hope
(74) *Attorney, Agent, or Firm* — Muir Patent Law, PLLC

(57) ABSTRACT

A viewer for analysis includes: a communication unit for receiving analysis results for each of a plurality of samples, the analysis results being different in type from each other and outputted from a plurality of types of analyzers; a display unit for displaying the analysis results received by the communication unit; a control unit for controlling the display unit; and a first selection means for selecting at least two or more display target samples from the plurality of samples. The display unit includes a display area for displaying the analysis results by the plurality of types of analyzers for each of the at least two or more display target (Continued)

samples; and a list display area for displaying at least two or more display areas in a list, the at least two or more display areas corresponding to the at least two or more display target samples.

7 Claims, 15 Drawing Sheets

(56)                    References Cited

U.S. PATENT DOCUMENTS

| | | | |
|---|---|---|---|
| 2007/0179715 | A1 | 8/2007 | Ariyoshi |
| 2012/0265487 | A1* | 10/2012 | Yanine .................. G01Q 30/04 |
| | | | 702/167 |
| 2014/0024072 | A1 | 1/2014 | Mizumoto et al. |
| 2017/0307551 | A1 | 10/2017 | Murakami |
| 2019/0303361 | A1 | 10/2019 | Ashida et al. |
| 2020/0341020 | A1* | 10/2020 | Nakajima ........ G01N 35/00722 |

FOREIGN PATENT DOCUMENTS

| | | | |
|---|---|---|---|
| JP | 2010-078371 | A | 4/2010 |
| JP | 2017-194360 | | 12/2018 |
| JP | 2019-174423 | A | 10/2019 |
| WO | 2010035530 | A1 | 4/2010 |
| WO | 2012-128345 | A1 | 9/2012 |

OTHER PUBLICATIONS

PCT Written Opinion of the International Searching Authority (Form PCT/ISA/237) for PCT application No. PCT/JP2021/008901 dated May 18, 2021.
Notice of Reasons for Refusal for corresponding Japanese Patent Application No. 2022-517527 dated Mar. 6, 2024.
Chinese Office Action dated Jun. 30, 2025 for corresponding application No. 202180031632.2 (and English-language 1 machine translation thereof).
Second Office Action dated Feb. 25, 2026 for corresponding application No. CN 202180031632.2, and English-language machine translation of the same.

* cited by examiner

FIG.5

| 101 | 102 | Sample selection | 110 | 112 | 113 | 114 |
|-----|-----|------------------|-----|-----|-----|-----|
| Sample selection | | ↓ Sample selection | Sample name | Device type | Device selection | Attribute value (Physical property value) |
| Feature amount selection | | | ☑ Sample 01 | LC, GC-MS, TEM | All | Tg:-101.4 |
| 104 | | | ☑ Sample 02 | GC-MS, TEM | LC | Tg:-82.0, High-temperature tan δ :1.0E+06 |
| Continued to display screen | | | ☑ Sample 03 | LC, TEM | GC | |
| 105 | | | ☐ Sample 04 | GC, SEM, FT-IR | LC-MS | |
| | | | | | GC-MS | |
| | | | | | SEM | |
| | | | | | TEM | |
| | | | | | FT-IR | |

FIG.12

| Physical property value name | Physical property value | | |
|---|---|---|---|
| Tg | −101.5 | −101.0 | |
| High-temperature tan δ | 1.0E+06 | 1.0E+06 | |
| Resin blending amount | 23.1 | 24.4 | |
| TEM feature amount name | | | |
| Filler particle diameter x50 （μm） | 25.146 | 28.253 | |
| Filler particle diameter x100 （μm） | | 60.315 | |

FIG.13

VIEWER FOR ANALYSIS, DISPLAY SYSTEM, DISPLAY METHOD, AND DISPLAY PROGRAM

TECHNICAL FIELD

The present invention relates to a viewer for analysis, a display system, a display method, and a display program.

BACKGROUND ART

An analysis system (hereinafter also referred to as "multiple analyzers cross-sectional analysis system") for analyzing a plurality of analysis results acquired by a plurality of types of analyzers in a cross-sectional manner has been proposed. As an analysis system of this kind, for example, Japanese Unexamined Patent Application Publication No. 2017-194360 (Patent Document 1) discloses a following sample analysis system. In this sample analysis system, a plurality of types of analyzers including at least one of an X-ray fluorescence analyzer, an atomic absorption photometer, and an inductively coupled plasma emission analyzer and at least one of an infrared spectrophotometer and a Raman spectrophotometer is used. Measurement data of a target sample is acquired, and the target sample is identified based on the acquired measurement data. In Patent Document 1, the measurement data acquired by a device suitable for analyzing inorganic substances and measurement data acquired by a device suitable for analyzing organic substances are used concurrently to improve the identification accuracy of the target sample.

PRIOR ART DOCUMENT

Patent Document

Patent Document 1: Japanese Unexamined Patent Application Publication No. 2017-194360

SUMMARY OF THE INVENTION

Problems to be Solved by the Invention

According to the multiple analyzers cross-sectional analysis system described above, there exists a plurality of analysis results by a plurality of types of analyzers for one sample, and therefore, it is possible to multilaterally analyze the sample by using the plurality of analysis results. Therefore, a highly accurate analysis can be expected.

However, a display device (hereinafter also referred to as "viewer for analysis") used in a conventional analysis system is not provided with a technique of displaying a plurality of analysis results collectively on one display screen for each analyzer and a technique of switching the display of analysis results of each analyzer. Further, in a prior art, in order to compare analysis results of the analyzers of the same type between a plurality of samples, the following operations are required. That is, it is necessary to collect files of analysis result data for each sample in a viewer for analysis, and the user who performs the analysis work opens to display the files one by one. As a consequence, the convenience of the user who performs the analysis work deteriorates, and therefore, there is a concern that the improvement of the analytical accuracy is hindered.

The present invention has been made to solve the above-described problems. It is an object of the present invention to provide a viewer for analysis, a display system, a display method, and a display program capable of facilitating a cross-sectional analysis of analysis results by a plurality of types of analyzers.

Means for Solving the Problem

A viewer for analysis according to a first aspect of the present invention is provided with:

a communication unit configured to receive analysis results for each of a plurality of samples, the analysis results being different in type from each other and outputted from a plurality of types of analyzers;

a display unit configured to display the analysis results received by the communication unit;

a control unit configured to control the display unit; and a first selection means configured to select at least two or more display target samples from the plurality of samples.

The display unit includes:

a display area configured to display the analysis results by the plurality of types of analyzers, for each of the at least two or more display target samples; and a list display area configured to display at least two or more display areas in a list, the at least two or more display areas corresponding to the at least two or more display target samples.

Effects of the Invention

According to the present invention, it is possible to easily perform a cross-sectional analysis of analysis results acquired by a plurality of types of analyzers.

BRIEF DESCRIPTION OF THE DRAWINGS

FIG. 5 is a diagram showing one example of an operation screen.

FIG. 12 is a diagram schematically showing a sixth display screen example of the viewer for analysis.

FIG. 13 is a diagram schematically showing a seventh display screen example of the viewer for analysis.

EMBODIMENTS FOR CARRYING OUT THE INVENTION

Hereinafter, some embodiments of the present invention will be described in detail with reference to the attached figures. Note that hereinafter, the same or corresponding portion in the figures will be assigned by the same or corresponding symbol in the figure, and the explanation thereof will not be basically repeated.

[Overall Configuration of Display System]

Figure 1:
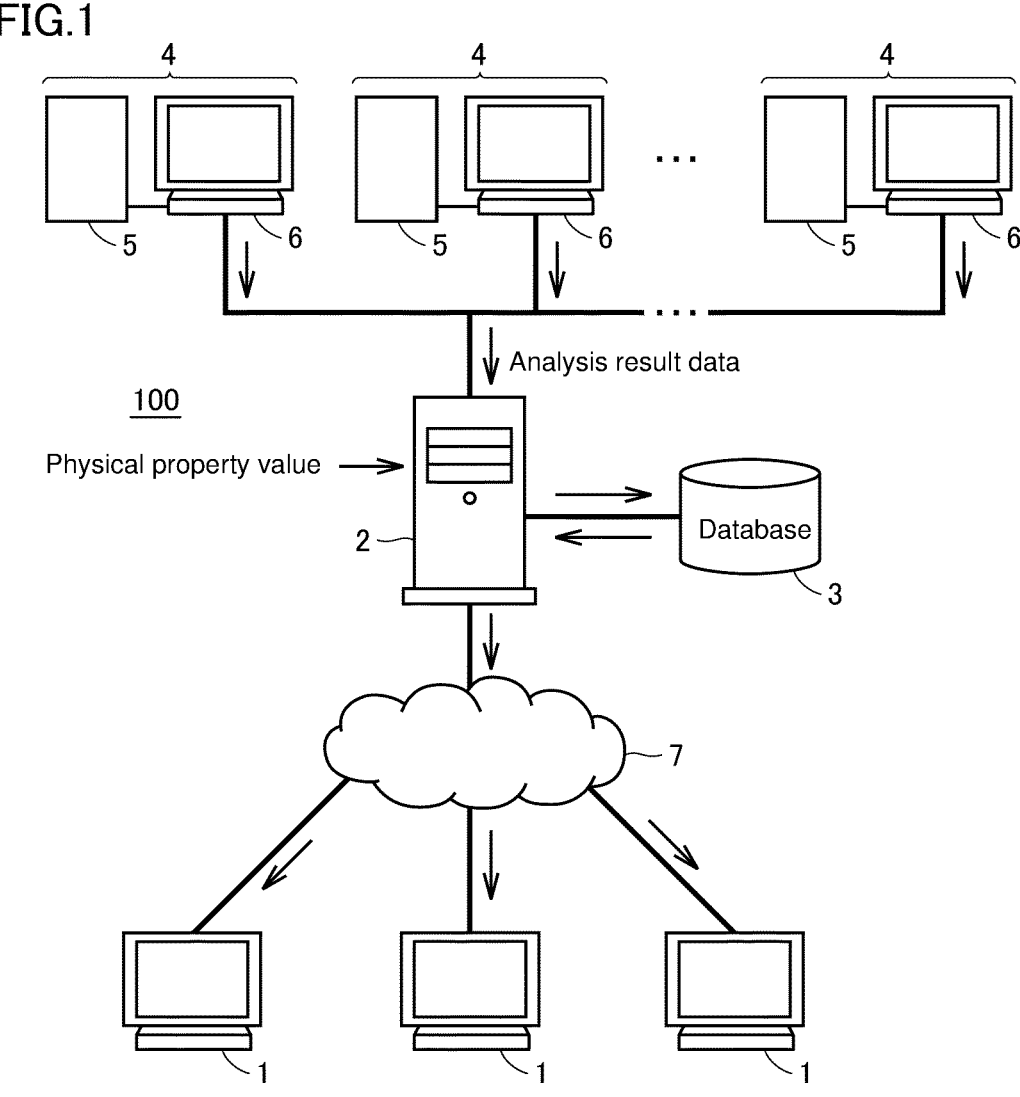
FIG. 1 is a schematic diagram showing a configuration example of a display system according to an embodiment.

FIG. 1 is a schematic diagram explaining a configuration example of a display system according to this embodiment. The display system 100 according to this embodiment may be applied to a multiple analyzers cross-sectional analysis system for cross-sectionally analyzing analysis results by a plurality of types of analyzers.

As shown in FIG. 1, the display system 100 is provided with a plurality of analyzers 4, a server 2, a database 3, and at least one viewer 1 for analysis.

The plurality of analyzers 4 analyzes a sample. The plurality of analyzers 4 includes, for example, a liquid chromatograph (LC), a gas chromatograph (GC), a liquid chromatograph mass spectrometer (LC-MS), a gas chromatograph mass spectrometer (GC-MS), a scanning electron microscope (SEM), a transmission electron microscopy (TEM), an energy dispersive X-ray fluorescence analyzer (EDX), a wavelength-dispersive fluorescence X-ray analyzer (WDX), a Fourier transform infrared spectrophotometer (FT-IR), and the like. The analyzer 4 may further include a photodiode array detector (LC-PDA), a liquid chromatography tandem mass analyzer (LC/MS/MS), a gas chromatography tandem mass analyzer (GC/MS/MS), a liquid chromatograph mass spectrometer (LC/MS-IT-TOF), a near-infrared spectrometer, a tensile tester, a compressive tester, and the like. In the display system 100 according to this embodiment, a plurality of types of analyzers shown in FIG. 1 are composed of a plurality of types of analyzers that outputs analysis results different in type from each other, and multifaced analyses of a single sample can be performed with the plurality of analyzers 4.

The analyzer 4 is composed of a device body 5 and an information processing device 6. The device body 5 analyzes a sample as an analysis target. To the information processing device 6, sample identification information and sample analysis conditions are inputted.

The information processing device 6 controls the analysis by the device body 5 in accordance with the inputted analysis conditions. With this, in the device body 5, "analysis data" showing analysis results of the sample is acquired. The information processing device 6 analyzes the analysis data acquired by the device body 5 using dedicated data analysis software to extract the "feature amounts" of the sample.

The information processing device 6 stores the extracted feature amounts of the sample together with the analysis conditions, the identification information, and the analysis data of the sample in a built-in memory. Specifically, the information processing device collectively stores the analysis conditions, the sample identification information, the analysis data, and the feature amounts as "analysis result data" for each sample.

The information processing device 6 is connected to the server 2 in a mutually communicable manner. The connection between the information processing device 6 and the server 2 may be wired or wireless. For example, the Internet can be used as the communication network connecting between the information processing device 6 and the server 2. With this, the information processing device 6 of each analyzer 4 can transmit analysis result data to the server 2 for each sample.

The server 2 is a server for mainly managing the analysis result data acquired by the plurality of analyzers 4. To the server 2, analysis result data for each sample is inputted from each analyzer 4. To the server 2, the "physical property values" of a sample can be further inputted from the outside of the server 2. The physical property values denote values indicating attribute values of the sample acquired by other than the analysis by the analyzer 4. Note that the above-described feature amounts correspond to attribute values of the sample acquired by the analysis with the analyzer 4 or attribute values acquired by subjecting the attribute value acquired by the analysis to arithmetic processing.

In the example of FIG. 1, although a configuration is shown in which the physical property values of the sample are inputted to the server 2, but it may be configured such that the physical property values are inputted to the analyzer 4. In this instance, the analyzer 4 transmits the physical property values to the server 2 together with the analysis result data for each sample. Alternatively, it may be configured such that the physical property values of the sample are inputted to the viewer 1 for analysis, which will be described later.

A database 3 is connected to the server 2. The database 3 is a storage for storing data to be exchanged between the server 2 and the plurality of analyzers 4 and data inputted from the outside of the server 2. In the example of FIG. 1, although the database 3 is configured by a storage externally connected to the server 2, it may be configured such that the database 3 is built in the server 2. Upon receipt of the analysis result data and the physical property values of a sample, the server 2 stores the analysis result data and the physical property values in the database 3 in an associated manner for each sample.

The server 2 is connected to the Internet 7. Further, at least one viewer 1 for analysis is connected to the Internet 7. Accordingly, the viewer 1 for analysis can bidirectionally transmit and receive data to and from the server 2 via the Internet 7. Note that the communication network connecting the server 2 and the viewer 1 for analysis is not limited to the Internet 7.

The viewer 1 for analysis is configured to be able to display the analysis result data and the physical property values of the sample selected by the user (for example, the analyst) as a display target. Specifically, upon receipt of the selection of the display target by the user, the viewer 1 for analysis accesses the server 2 via the Internet 7. With this, the viewer 1 for analysis acquires the analysis result data and the physical property values of the sample selected as a display target and stored in the database 3. The viewer 1 for analysis displays the acquired analysis result data and physical property values on the display screen.

In a case where a plurality of samples is selected as display targets, the viewer 1 for analysis can display the analysis result data and the physical property values of the plurality of samples on the display screen side by side. The display examples in the viewer 1 for analysis will be described later.

[Hardware Configuration Example of Display System]

Figure 2:
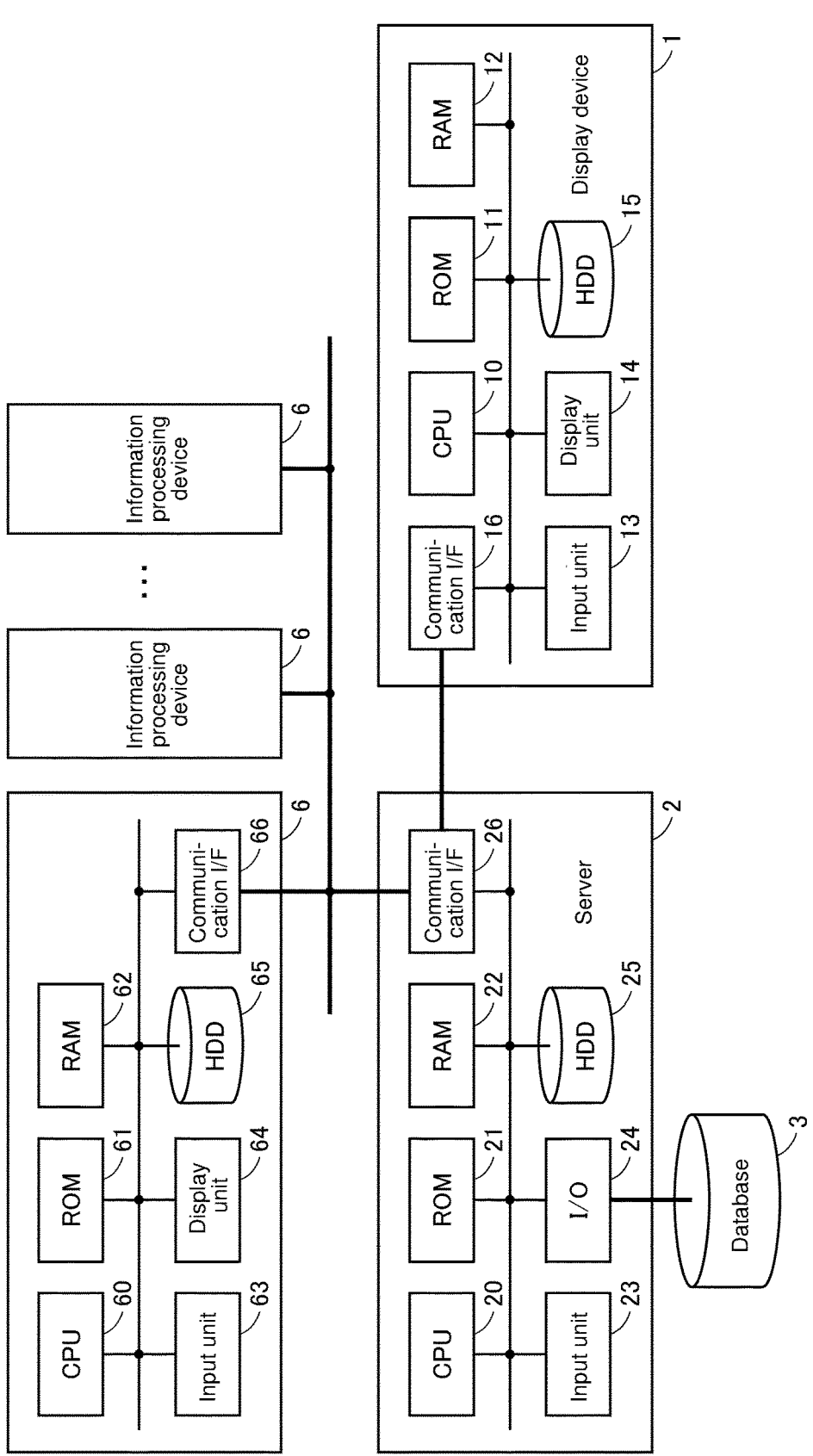
FIG. 2 is a diagram schematically showing a hardware configuration example of an information processing device, a server, and a viewer for analysis.

FIG. 2 is a diagram schematically showing the hardware configuration example of the information processing device 6, the server 2, and the viewer 1 for analysis.

(Hardware Configuration of Information Processing Device)

As shown in FIG. 2, the information processing device 6 is provided with a CPU (Central Processing Unit) 60 for controlling the entire analyzer 4, and a storage unit for storing programs and data and is configured to be operated according to the programs.

The storage unit includes a ROM (Read Only Memory) 61, a RAM (Random Access Memory) 62, and an HDD (Hard Disk Drive) 65. The ROM 61 can store programs to be executed by the CPU 60. The RAM 62 can temporarily store data to be used when the program is executed by the CPU 60 and can function as a temporary data memory to be used as a working area. The HDD 65 is a non-volatile storage device and can store the measurement data by the device body 5 and the information generated by the information processing device 6, such as, e.g., the analysis result, by the information processing device 6. In addition to or in place of the HDD 65, a semiconductor-memory device, such as, e.g., a flash memory, may be employed.

The information processing device 6 further includes a communication interface (I/F) 66, an input unit 63, and a display unit 64. The communication I/F 66 is an interface for the information processing device 6 to communicate with an external device including the device body 5 and the server 2.

The input unit 63 accepts an input including an instruction to the information processing device 6 from the user (e.g., the analyst). The input unit 63 includes a keyboard, a mouse, a touch panel integrally formed with a display screen of the display unit 64, and the like, and accepts analysis conditions and the identification information of the sample.

The display unit 64 can display, for example, an input screen for analysis conditions and the identification information on a sample at the time of setting the analysis conditions. During the analysis, the display unit 64 can display the measurement data detected by the device body 5 and the analysis results by the information processing device 6.

The processing by the analyzer 4 is realized by each hardware and the software executed by the CPU 60. In some cases, such software is pre-stored in the ROM 61 or the HDD 65. Further, the software is sometime stored in a storage medium (not shown) distributed as a program product. The software is read out from the HDD 65 by the CPU 60 and stored in the RAM 62 in a form executable by the CPU 60. The CPU 60 executes the program.

(Hardware Configuration of Server)

The server 2 is provided with a CPU 20 for controlling the entire device and a storage unit for storing programs and data and is configured to be operated according to the programs. The storage unit includes the ROM 21, the RAM 22, and the HDD 25.

The ROM 21 can store programs to be executed by the CPU 20. The RAM 22 can temporarily store the data to be used during the execution of the program by the CPU 20 and can function as a temporary data memory to be used as a working area. The HDD 25 is a non-volatile storage device and can store the information transmitted from the information processing device 6.

The server 2 further includes a communication I/F 26, an input/output interface (I/O) 24, and an input unit 23. The communication I/F 26 is an interface for the server 2 to communicate with an external device including the information processing device 6 and the viewer 1 for analysis.

The I/O 24 is an interface for inputting to the server 2 or outputting to the server 2. The I/O 24 is connected to the database 3. The database 3 is a memory for storing the data transmitted and received between the server 2 and the information processing device 6.

The input unit 23 receives an input including an instruction from the user (for example, the administrator of the display system 100). The input unit 23 includes a keyboard, a mouse, and the like and receives the information on the physical property values of the sample or the like.

(Hardware Configuration of Viewer for Analysis)

The viewer 1 for analysis is provided with a CPU 10 for controlling the entire device and a storage unit for storing programs and data and is configured to be operated according to the programs. The storage unit includes a ROM 11, a RAM 12, and an HDD 15.

The ROM 11 can store programs to be executed by the CPU 10. The RAM 12 can temporarily store the data to be used during the execution of the program by the CPU 10 and can function as a temporary data memory to be used as a working area. The HDD 15 is a non-volatile storage device and can store the information transmitted from the server 2.

The viewer 1 for analysis further includes a communication I/F 16, an input unit 13, and a display unit 14. The communication I/F 16 is an interface for the viewer 1 for analysis to communicate with an external device including the server 2.

The input unit 13 receives an input including an instruction to the viewer 1 for analysis from the user (for example, the analyst). The input unit 13 includes a keyboard, a mouse, a touch panel integrally formed with a display screen of the display unit 14, and the like, and accepts a selection of a display target or the like.

The display unit 14 can display an operation screen for selecting, e.g., a display target when selecting the display target. The display unit 14 can further display analysis data, such as, e.g., a generated sample image or the like.

The processing in the viewer 1 for analysis is realized by each hardware and software executed by the CPU 10. In some cases, such software is pre-stored in the ROM 11 or the HDD 15. Further, the software is sometime stored in a storage medium (not shown) and distributed as a program product. The software is read out from the HDD 15 by the CPU 10 and stored in the RAM 12 in a form executable by the CPU 10. The CPU 10 executes this program.

[Functional Configuration of Display System]

Figure 3:
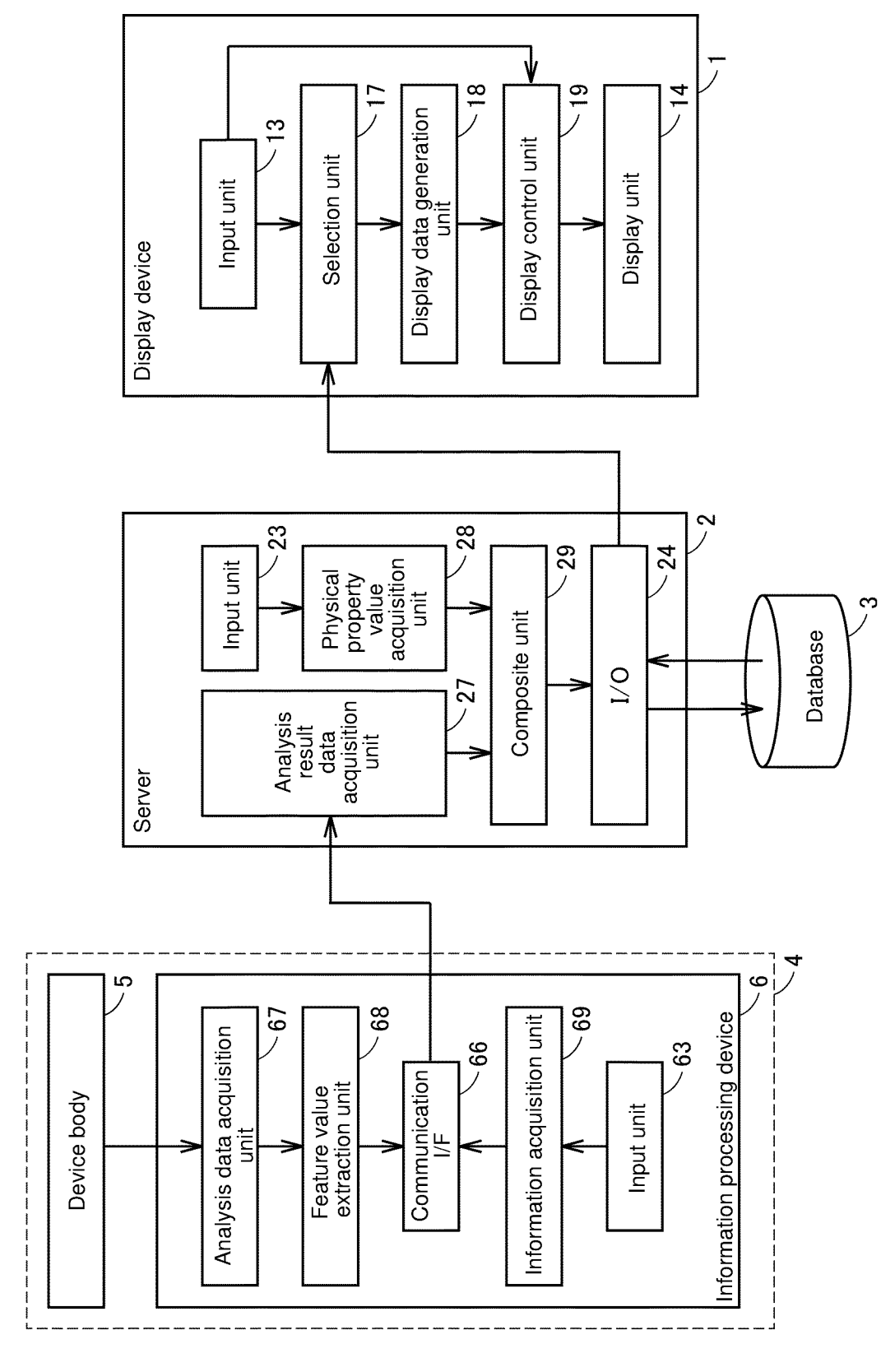
FIG. 3 is a diagram schematically showing a functional configuration of the information processing device, the server, and the viewer for analysis.

FIG. 3 is a diagram schematically showing the functional configurations of the information processing device 6, the server 2, and the viewer 1 for analysis.

(Functional Configuration of Information Processing Device)

As shown in FIG. 3, the information processing device 6 is provided with an analysis data acquisition unit 67, a feature amount extraction unit 68, and an information acquisition unit 69. These functional configurations are realized by executing predetermined programs by the CPU 60 in the information processing device 6 shown in FIG. 2.

The analysis data acquisition unit 67 acquires analysis data indicating the analysis results of the sample, from the device body 5. For example, in a case where the analyzer 4 is a chromatograph mass spectrometer, the analysis data includes chromatograms and mass spectra. In a case where the analyzer 4 is a scanning electron microscope or a transmission electron microscope, the analysis data includes image data showing the microscopic image of the sample. The analysis data acquisition unit 67 forwards the acquired analysis data to the feature amount extraction unit 68.

The feature amount extraction unit 68 analyzes the analysis data transferred from the analysis data acquisition unit 67 using dedicated data analysis software to extract the feature amounts of the sample. The feature amounts of the sample include, for example, the components contained in the sample, the particle diameter of the particle having the components, the peak intensity and the peak area of the spectrum, the absorbance, the reflectance, the test intensity, the Young's modulus, the tensile strength, the deformation amount, the strain amount, and the breaking time. For example, in a case where the analysis data is a mass spectrum, the feature amounts include the peak intensity and the peak area.

The information acquisition unit 69 acquires the information received by the input unit 63. Specifically, the information acquisition unit 69 acquires the sample identification information and the information on the sample analysis conditions. The sample identification information includes, for example, a sample name, a name, a model number, a serial number, etc., of a product to be served as a sample. The analysis conditions of the sample include device parameters including a name and a model number of an analyzer to be used and measurement parameters indicating the measuring conditions, such as, e.g., an application condition of a voltage and/or a current and a temperature condition.

The communication I/F 66 collectively transmits the acquired analysis data, the analysis conditions, the sample identification information, and the extracted feature amounts as analysis result data for a sample unit to the server 2.

(Functional Configuration of Server)

The server 2 has an analysis result data acquisition unit 27, a physical property value acquisition unit 28, and a composite unit 29. These functional configurations are realized by executing predetermined programs by the CPU 20 in the server 2, shown in FIG. 2.

The analysis result data acquisition unit 27 acquires the analysis result data transmitted from the information processing device 6 of each analyzer 4 via the communication I/F 26 (not shown).

The physical property value acquisition unit 28 acquires the information indicating the physical property values of the sample received by the input unit 23. The physical property values of the sample are values indicating the attributes of the sample acquired by other than the analysis by the analyzer 4. The physical property values of the sample include, for example, the value indicating the performance of the sample or the value (such as the number of years of use) indicating the degree of deterioration of the sample.

The composite unit 29 associates the analysis result data (sample identification information, analysis conditions, analysis data, and feature amounts) with the physical property values, for each sample. The composite unit 29 stores the data associated for each sample in the database 3 via the I/O 24. In a case where a plurality of analysis result data by a plurality of analyzers 4 exists for one sample, the server 2 stores the plurality of analysis result data in the database 3 in association with the physical property values. As a result, at least one analysis result data and the physical property values are accumulated in the database 3 in a sample unit.

(Control Configuration of Viewer for Analysis)

The viewer 1 for analysis has a selection unit 17, a display data generation unit 18, and a display control unit 19. These functional configurations are realized by executing a predetermined program by the CPU 10, in the viewer 1 for analysis illustrated in FIG. 2.

The selection unit 17 selects a target to be displayed on the viewer 1 for analysis in accordance with the user instruction received by the input unit 13. The selection of the display target includes a selection of a sample and a selection of attribute values (feature amounts and physical property values) of a sample. As will be described later, on the display screen of the viewer 1 for analysis, an operation screen for selecting a display target is displayed. On the operation screen, the information indicating the contents of the data stored in the database 3 is displayed. The user can make a selection operation using the input unit 13 on the operation screen.

Specifically, the selection unit 17 selects at least two or more samples from the plurality of samples analyzed by the at least one analyzer 4 of the plurality of analyzers 4 (see FIG. 1), according to the selection operation by the user. The selection unit 17 further selects the attribute values (feature amounts and physical property values) for the selected at least two or more samples in accordance with the selection by the user. The selection unit 17 corresponds to one example of the "first selection means" and the "second selection means."

The display data generation unit 18 acquires the analysis result data and the physical property values of the sample selected as the display target from the database 3 by accessing the server 2 via the Internet 7. As described above, the analysis result data includes the analysis data of the sample by the at least one analyzer 4, the analysis conditions thereof, the sample identification information, and the feature amounts of the sample extracted from the analysis data. Further, the physical property values are associated with the analysis result data for each sample.

The display data generation unit 18 extracts the analysis data of the analyzer 4 selected by the selection unit 17 and the feature amounts and the physical property values from the analysis result data and the physical property values acquired from the database 3. The display data generation unit 18 generates display data of a display format that can be displayed on a display screen.

The display control unit 19 displays the display data generated by the display data generation unit 18 on the display screen of the display unit 14. When the input unit 13 accepts a user instruction for a display format, the display control unit 19 can change the display format in accordance with the user instruction. The display data generation unit 18 and the display control unit 19 correspond to one example of the "display control unit."

[Operation of Display System]

Next, the operation of the display system 100 will be described. In the following description, the display processing performed by the viewer 1 for analysis will be mainly described.

Figure 4:
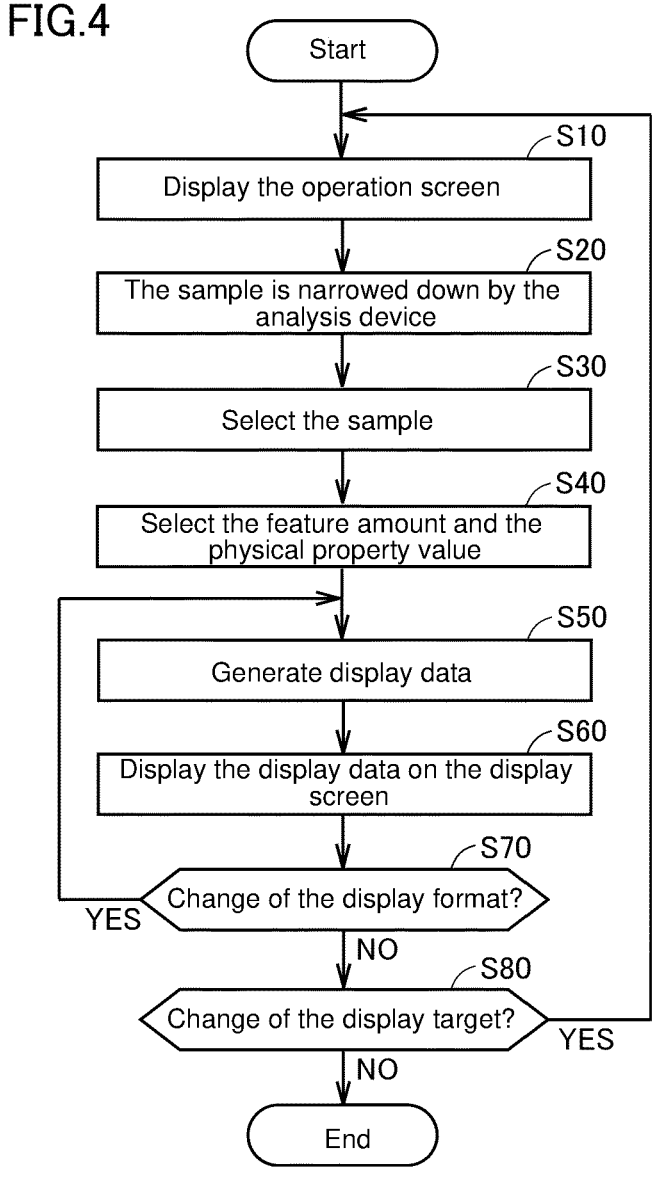
FIG. 4 is a flowchart for explaining display processing in the viewer for analysis.

FIG. 4 is a flowchart for explaining the display processing in the viewer 1 for analysis. The program according to the flowchart of FIG. 4 is stored in the ROM 11 of the viewer 1 for analysis in advance. The processing is realized by the executing the program by the CPU 10.

Figure 6:
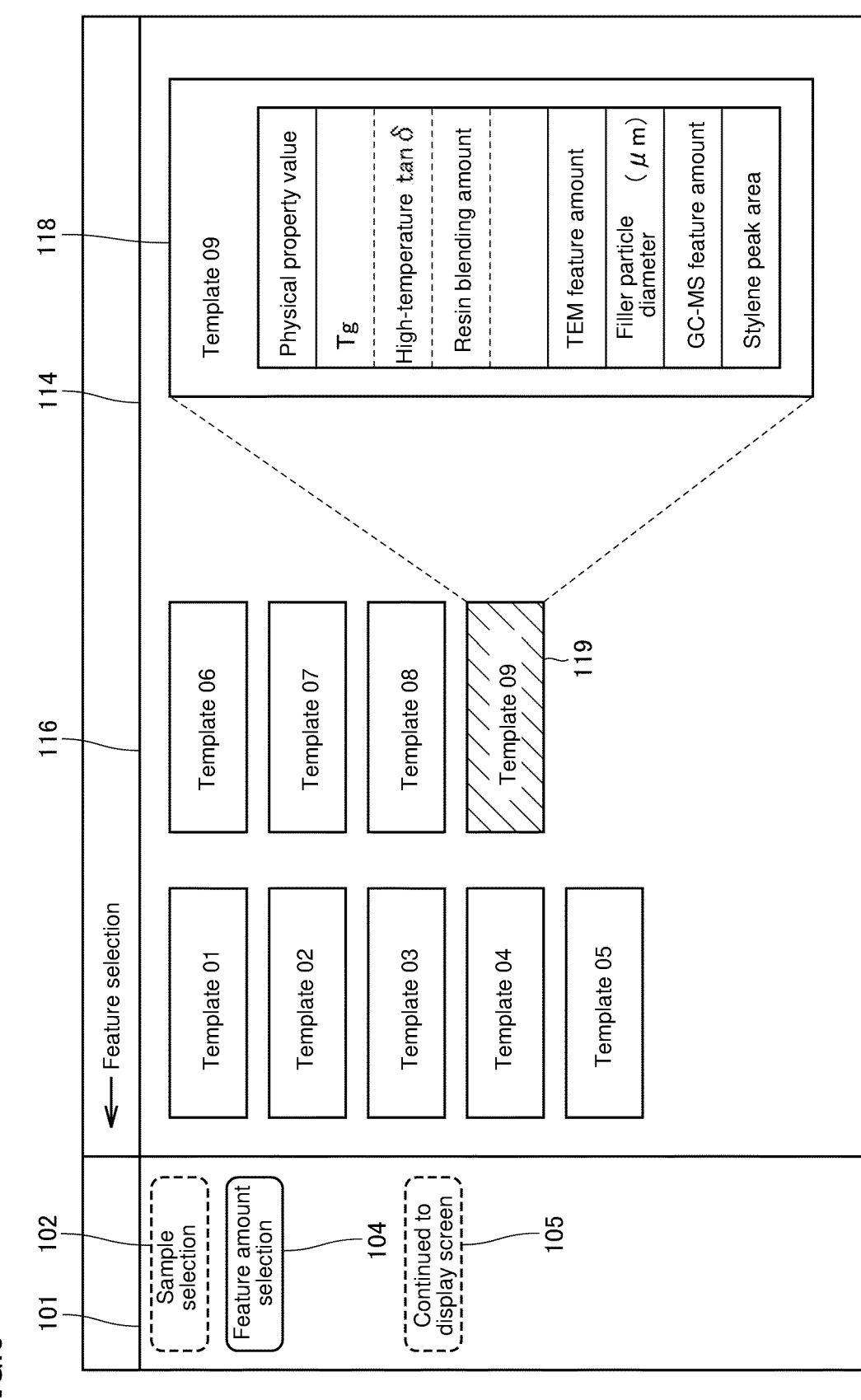
FIG. 6 is a diagram showing one example of an operation screen.

Upon receipt of an instruction to start the display operation in the input unit 13, the viewer 1 for analysis starts the display processing shown in FIG. 4. The viewer 1 for analysis first displays an operation screen for selecting the display target on the display unit 14 in Step S10. FIG. 5 and FIG. 6 are diagrams showing one example of an operation screen. The operation screen can be generated based on the data stored in the database 3.

In the display area 101 of the operation screen, icons 102 and 104 for the selection operation and an icon 105 for the display operation are displayed. When the user clicks the sample selection icon 102, a sample selection operation screen shown in FIG. 5 is displayed. In the display area 110 of the sample selection operation screen, a list of samples analyzed by any of the plurality of analyzers 4 (see FIG. 1) is shown in a table format. In the example of FIG. 5, sample names (Sample 01 to Sample 04) of the four samples are displayed. In addition to the sample names, the product name or the lot number of the sample may be displayed as the sample identification information. In the following description, it is assumed that four samples are tires.

In a case where the number of samples to be displayed in the display area 110 is large, the user can narrow down the number of samples to be displayed in the display area 110 by operating the operation screen of FIG. 5 using the input unit 13. In the example of FIG. 5, the user can narrow down the number of samples using analyzers as a clue. Specifically, the icon 113 for narrowing down the number of samples is arranged in the display area 112 of the operation screen. In the icon 113, a list of types of a plurality of analyzers 4 is shown. The user can select an analyzer 4 corresponding to the analysis data to be displayed by clicking the analyzer 4. At this time, the user can simultaneously select two or more analyzers 4. By clicking "All" in the icon 113, a plurality of analyzers 4 can be selected. When analyzers 4 are selected in the icon 113, in the display area 110, samples analyzed by the selected analyzers 4 are extracted, and a list of the extracted samples is displayed in a tabular format.

In the display area 112 of the operation screen, for each sample, the types of at least one analyzer 4 used for the analysis is displayed. For example, for the sample named "Sample 01," LC, GC-MS, and TEM are shown as the analyzers 4 used in the analyses. For the sample named "Sample 02," GC-MS and TEM are shown.

In the display area 114 of the operation screen, the attribute values for each sample are displayed. The attribute values of the sample include the physical property values of the sample. In the example of FIG. 5, as the physical property values of the sample, the glass-transition temperature (Tg) and the dynamic loss coefficient (rolling coefficient tan δ) at the high temperature (around 60° C.) of the tire are displayed. Note that the physical property values are attribute values supplied from the outside of the display system 100, and therefore, there is a case in which a sample does not have physical property values depending on the sample. Further, the types of physical property values may differ between samples.

The user can select a sample to be displayed by operating the operation screen of FIG. 5 using the input unit 13. In the example of FIG. 5, a sample can be selected by checking (put the ✓ mark in FIG. 5) the checkbox arranged next to each sample name.

Next, when the user clicks the feature amount selection icon 104 displayed in the area 101 of the operation screen, a feature amount selection operation screen shown in FIG. 6 is displayed in the display unit 14. Referring to FIG. 6, a list of a plurality of templates generated in advance is displayed in the area 116 of the feature amount selection operation screen. In the example of FIG. 6, a total of nine templates is displayed in the form of icons.

In each template, feature amounts that can be extracted from the analysis data are specified for each analyzer 4. For example, when the icon 119 indicating "Template 09" is clicked, the image 118 indicating the contents of Template 09 is displayed on the operation screen. In the image 118 of Template 09, the filler particle diameter (μm) and the peak area of the styrene are designated. The particle diameter (μm) of the fillers is a feature amount extracted from the analysis data (TEM image) of TEM. The peak area of styrene is a feature amount extracted from the analysis data (mask chromatogram) of GC-MS when contained in the tire.

Note that in each template, physical property values can be specified together with feature amounts. For example, in Template 09, as the physical property values of the tire, the glass-transition temperature (Tg), the dynamic loss coefficient (rolling coefficient tan δ) at high temperature (around 60° C.), and the resin blending amount of the tire are designated.

The user can generate a template specifying attribute values (feature amounts and physical property values) of a sample in advance. As shown in FIG. 6, by generating a plurality of types of templates, it is possible to simplify the selection operation of the feature amounts and the physical property values. In the example of FIG. 6, feature amounts and physical property values can be selected by clicking the icon 119 indicating any one template out of nine templates.

Returning to FIG. 4, upon receipt of a selection operation by the user on the operation screen, the viewer 1 for analysis selects the sample, the feature amounts, and the physical property values to be displayed in accordance with the selection operation in Steps S20 to S40.

The viewer 1 for analysis proceeds to Step S50 to generate display data. Specifically, the viewer 1 for analysis accesses the server 2 via the Internet 7 to acquire the analysis result data and the physical property values of the sample selected in Step S30 from the database 3.

Next, the viewer 1 for analysis extracts the feature amounts and the physical property values selected in Step S40 for each sample from the acquired physical property values. The viewer 1 for analysis generates display data based on the extracted data in Step S50.

Next, when the user clicks the display operation icon 105 displayed in the area 101 of the operation screen, the viewer 1 for analysis proceeds to Step S60 to display the generated display data on the display screen of the display unit 14. FIG. 7 to FIG. 15 are diagrams schematically showing display screen examples of the viewer 1 for analysis. Note that the viewer 1 for analysis is configured to be able to switch the display format of the display data in accordance with a user instruction. The first to ninth display screen examples shown below are based on a plurality of display formats included in the viewer 1 for analysis. Therefore, the viewer 1 for analysis can appropriately switch the first to ninth display screen examples in accordance with the user instruction.

(First Display Screen Example)

Figure 7:
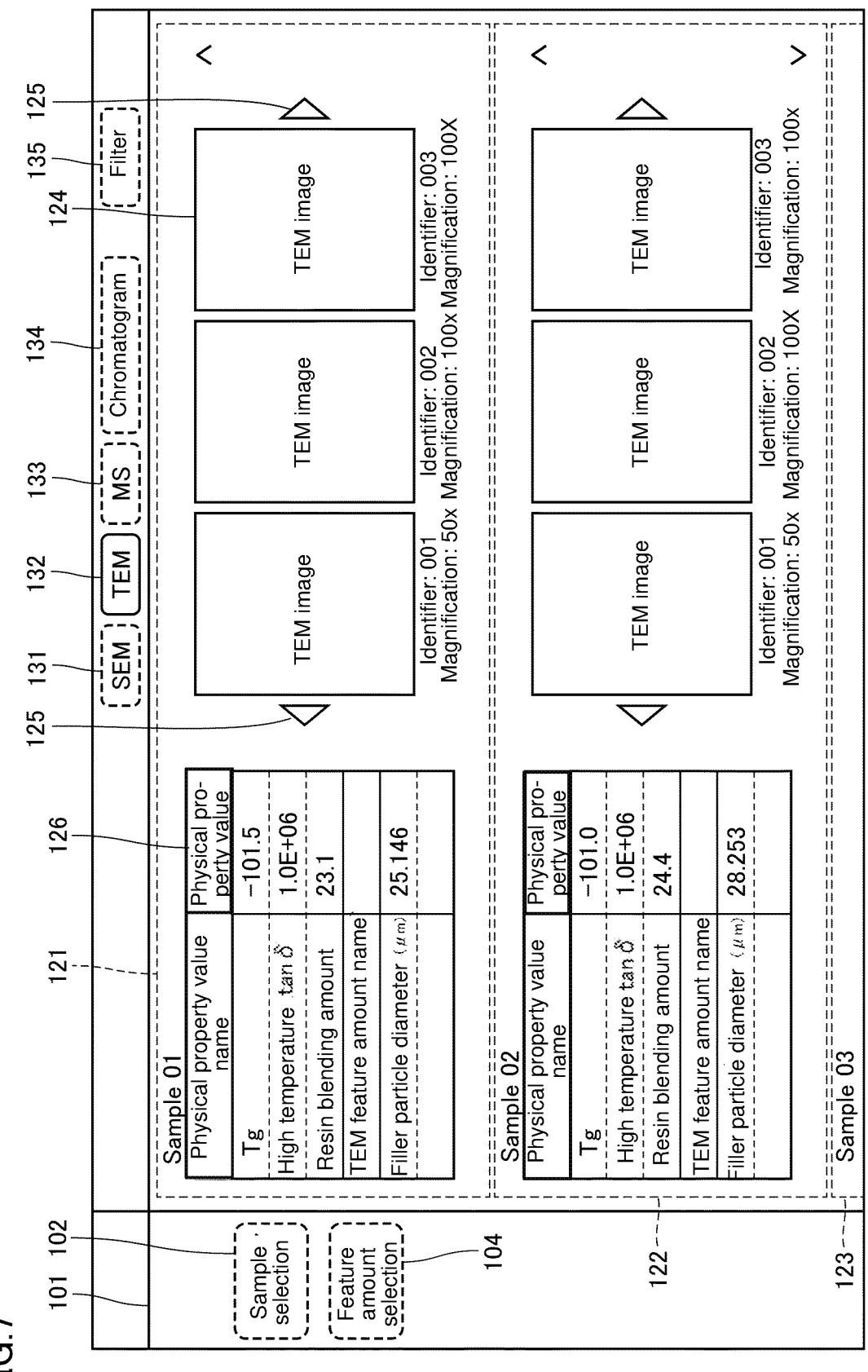
FIG. 7 is a diagram schematically showing a first display screen example of the viewer for analysis.

Referring to FIG. 7, in the first display screen example, a display area is set for each sample selected as a display target. In the example of FIG. 7, a display area 121 is set for the sample named "Sample 01," a display area 122 is set for the sample named "Sample 02," and a display area 123 is set for the sample named "Sample 03." In the first display screen example, a plurality of display areas 121,122, and 123 corresponding to the plurality of sample Samples 01 . . . . is listed. The plurality of display areas 121 to 123 constitute a "list display area" for listing a display area as a whole for each sample. By operating the input unit 13, the user can scroll the plurality of display areas 121 to 123 displayed in the list display area in the up-down direction (which corresponds to the vertical direction in the paper surface).

In the display area of each sample, the sample identification information, the analysis data by the analyzer 4, and the attribute values (feature amounts and physical property values) of the sample are collectively displayed. In the example of FIG. 7, in the display area 121, the sample name "Sample 01" which is the sample identification information, TEM images 124 which are analysis data, and a table 126 which summarizes the feature amounts and the physical property values of the sample are displayed.

Above the display area 121, icons 131 to 134 for switching the analysis data displayed on each display area are arranged. The icons 131 to 134 correspond to an SEM image, a TEM image, a Mass Spectrum (MS), and a chromatogram, respectively. In the example of FIG. 7, it is assumed that a TEM image is displayed in each display area in response to the clicking the icon 132 by the user.

Note that the displays of the icons 131 to 134 are not limited thereto and may be appropriately changed corresponding to the analysis data of the analyzer 4 selected as a display target. For example, in a case where an SEM is not included in the analyzer 4 selected to be displayed, the display of the icon 131 may be omitted.

Above the display area 121, a filtering icon 135 for selecting analysis data to be displayed on each display area is further arranged. The icon 135 can be used to select analysis results to be displayed in the display area when the analysis data includes a plurality of analysis results.

In the first display screen example, three TEM images 124 are arranged side by side in the display area 121 in the left-right direction (which corresponds to the horizontal direction in the paper surface). All of the TEM images 124 included in the analysis data can be scrolled in the left-right direction by clicking the cursor 125 arranged on both ends of the TEM images 124 in the left-right direction. Below each TEM image 124, analysis conditions for each image, such as, e.g., observation magnification, may be described. It should be noted that in a case where the cursor 125 in the display area 121 is clicked to scroll the TEM image 124, it may be configured such that the TEM images displayed in the other display areas 122 and 123 are scrolled to follow the TEM image 124 in the display area 121.

In the table 126, the feature amount (filler particle diameter) and the physical property values (Tg, high-temperature tan δ and resin blending amount) selected as display targets are shown. According to this, the user can simultaneously refer to the analysis data by the analyzer 4 and the attribute values (feature amounts and physical property values) for one sample.

Note that, in the first display screen example, the display area 122 and the display area 123 have the same configuration as the display area 121. That is, in the display screen, analysis data of the same type, feature amounts and physical property values of the same type are listed side by side for the plurality of samples as display targets. With this, the user can compare and refer to the analysis data of the same type among a plurality of samples. Further, the user can compare and refer to the feature amounts and physical property values of the same type among a plurality of samples.

(Second Display Screen Example)

Figure 8:
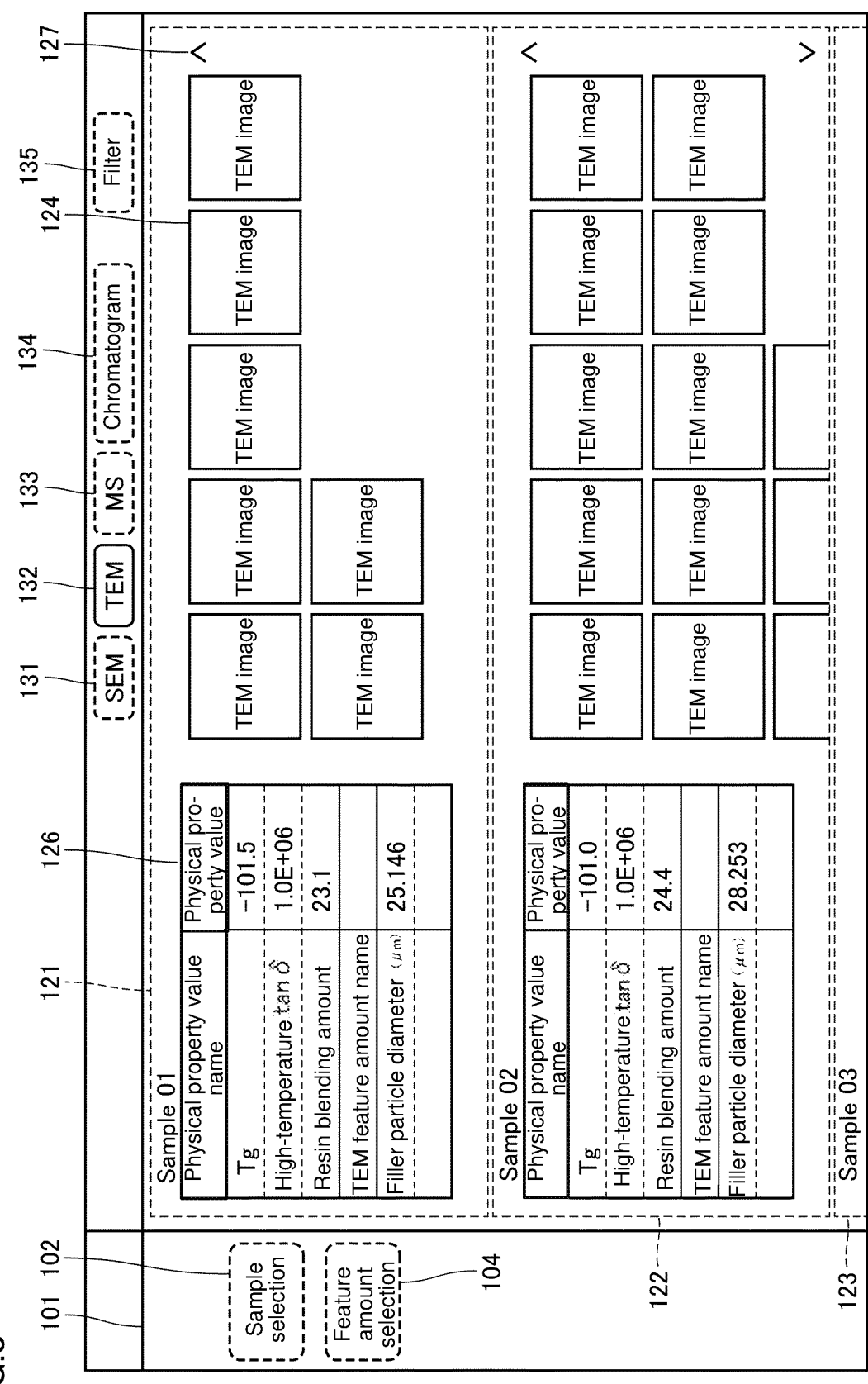
FIG. 8 is a diagram schematically showing a second display screen example of the viewer for analysis.

The second display screen example shown in FIG. 8 differs from the first display screen example shown in FIG. 7 only in the display format of analysis data. Therefore, the portion similar to the portion of the first display screen example will not be described repeatedly.

Referring to FIG. 8, in the second display screen example, all of the analysis data (all of the TEM images 124) acquired by the analyzers 4 are arranged in a matrix. According to this, the user can grasp the entire analysis data by the analyzers 4 for each sample. By clicking cursor 127 provided at the end of the display area in the horizontal direction in each display area, all of the analysis data can be scrolled in the vertical direction.

(Third Display Screen Example)

Figure 9:
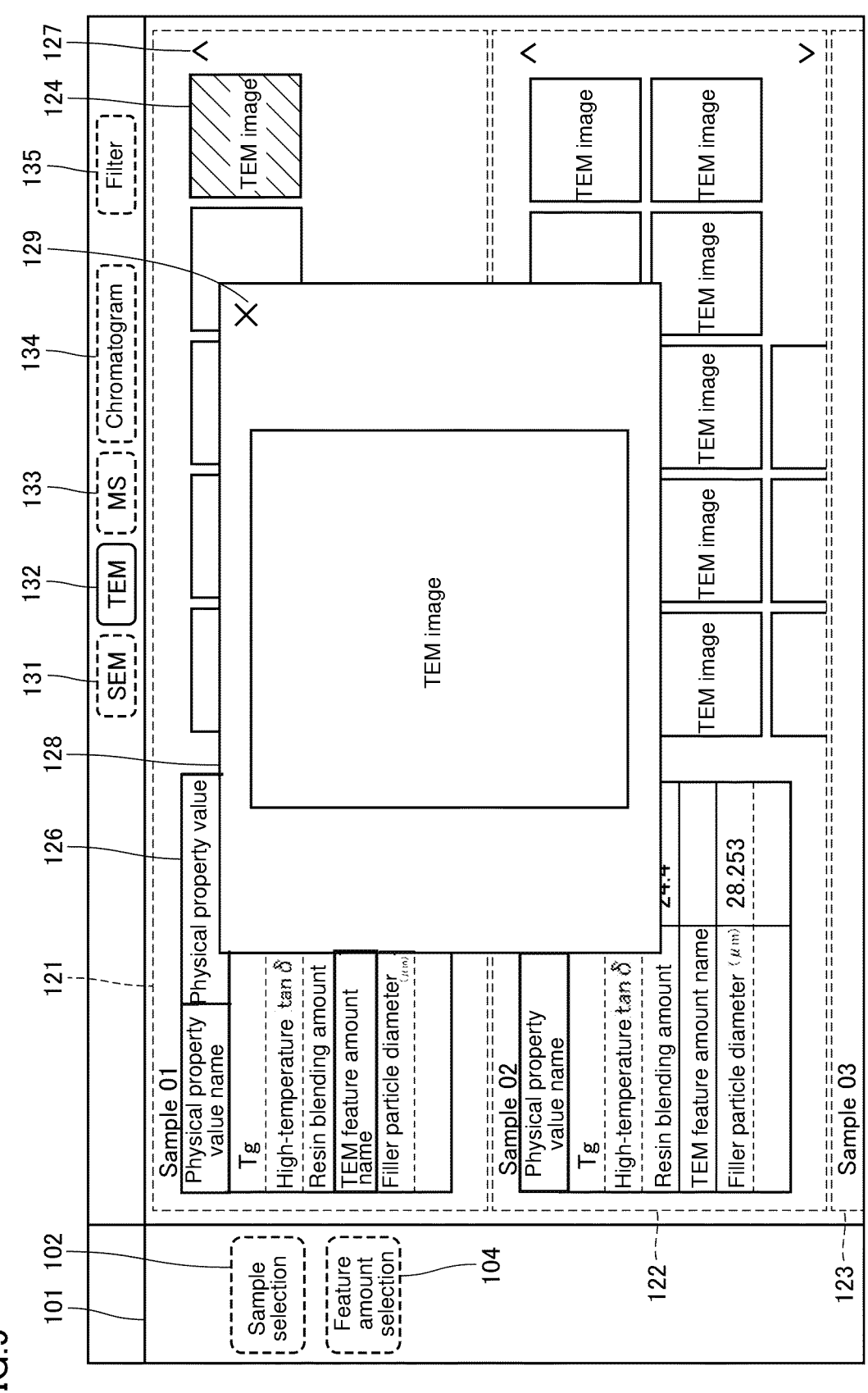
FIG. 9 is a diagram schematically showing a third display screen example of the viewer for analysis.

The third display screen example shown in FIG. 9 is derived from the second display screen example shown in FIG. 8. When the user performs an operation of selecting one TEM image 124 on the display screen shown in FIG. 8, as shown in FIG. 9, an enlarged image 128 of the selected TEM image 124 is displayed in the center part of the screen. This allows the user to retrieve and view the analysis data of interest. In FIG. 9, a case in which one TEM image 124 is selected is illustrated, but in a case where two or more TEM images 124 are selected, each of the TEM images 124 may be displayed in an enlarged manner.

At the right corner of the image 128, an icon 129 to stop displaying the enlarged image 128 is arranged. By clicking the icon 129, the enlarged screen can be returned to the display screen example of FIG. 8.

(Fourth Display Screen Example)

Figure 10:
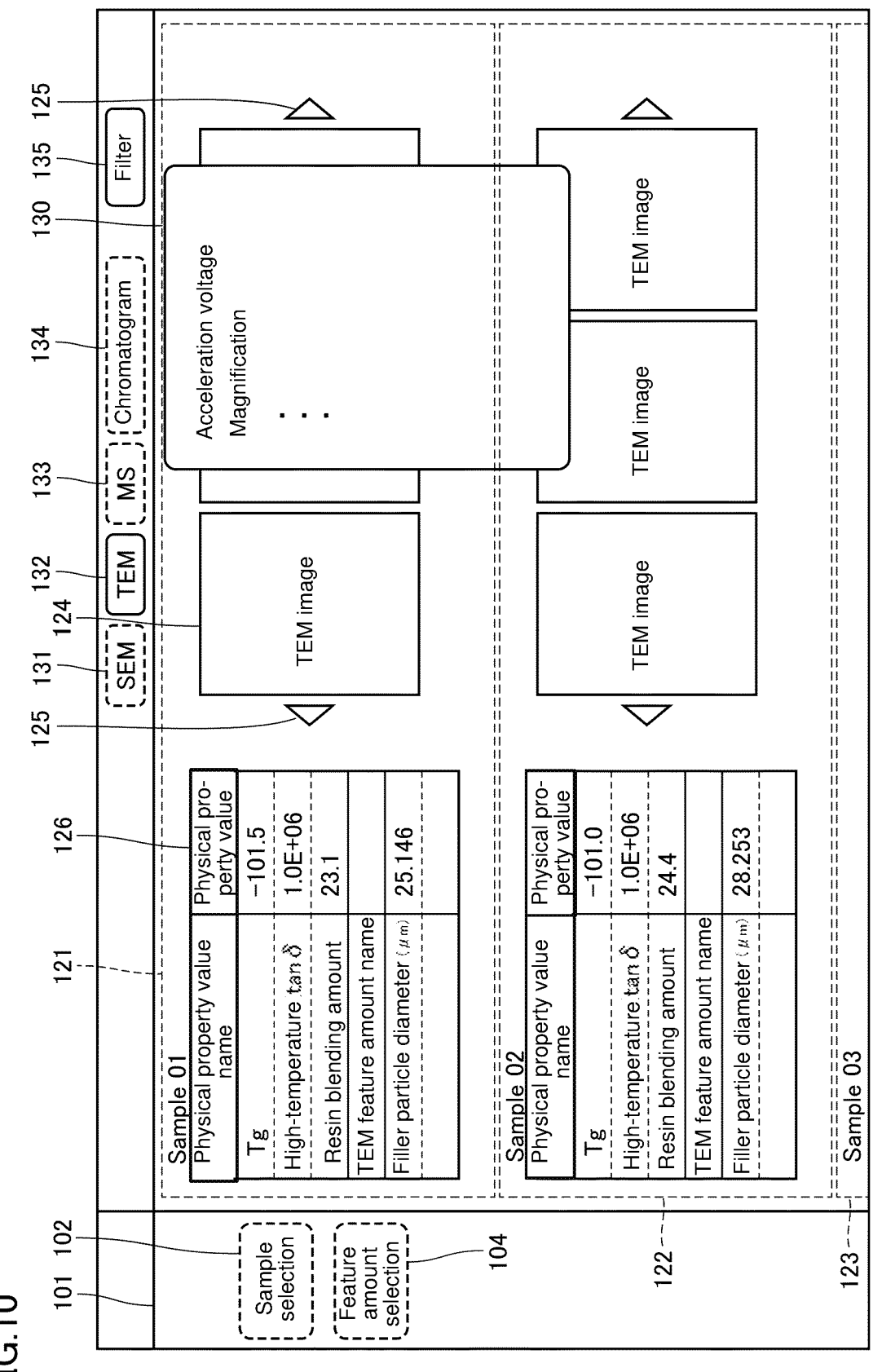
FIG. 10 is a diagram schematically showing a fourth display screen example of the viewer for analysis.

The fourth display screen example shown in FIG. 10 differs from the first display screen example shown in FIG. 7 only in the display format of analysis data. Therefore, the portion similar to the portion of the first display screen example will not be described repeatedly.

Referring to FIG. 10, when the icon 135 for filtering is clicked, an icon 130 for selecting some of the plurality of analysis results included in the analysis data is displayed in the display screen. When the analysis data includes a plurality of TEM images 124, the icon 130 is used to set conditions for selecting the TEM image 124 to be displayed in the display area for each sample from the plurality of TEM images 124. In the example of FIG. 10, analysis conditions (acceleration voltage, observation magnification, etc., of the TEM) are set as selection conditions. With this, only the TEM image 124 acquired in the set analysis conditions can be displayed. Note that the selection conditions can be arbitrarily set by using the input unit 13 by the user.

(Fifth Display Screen Example)

Figure 11:
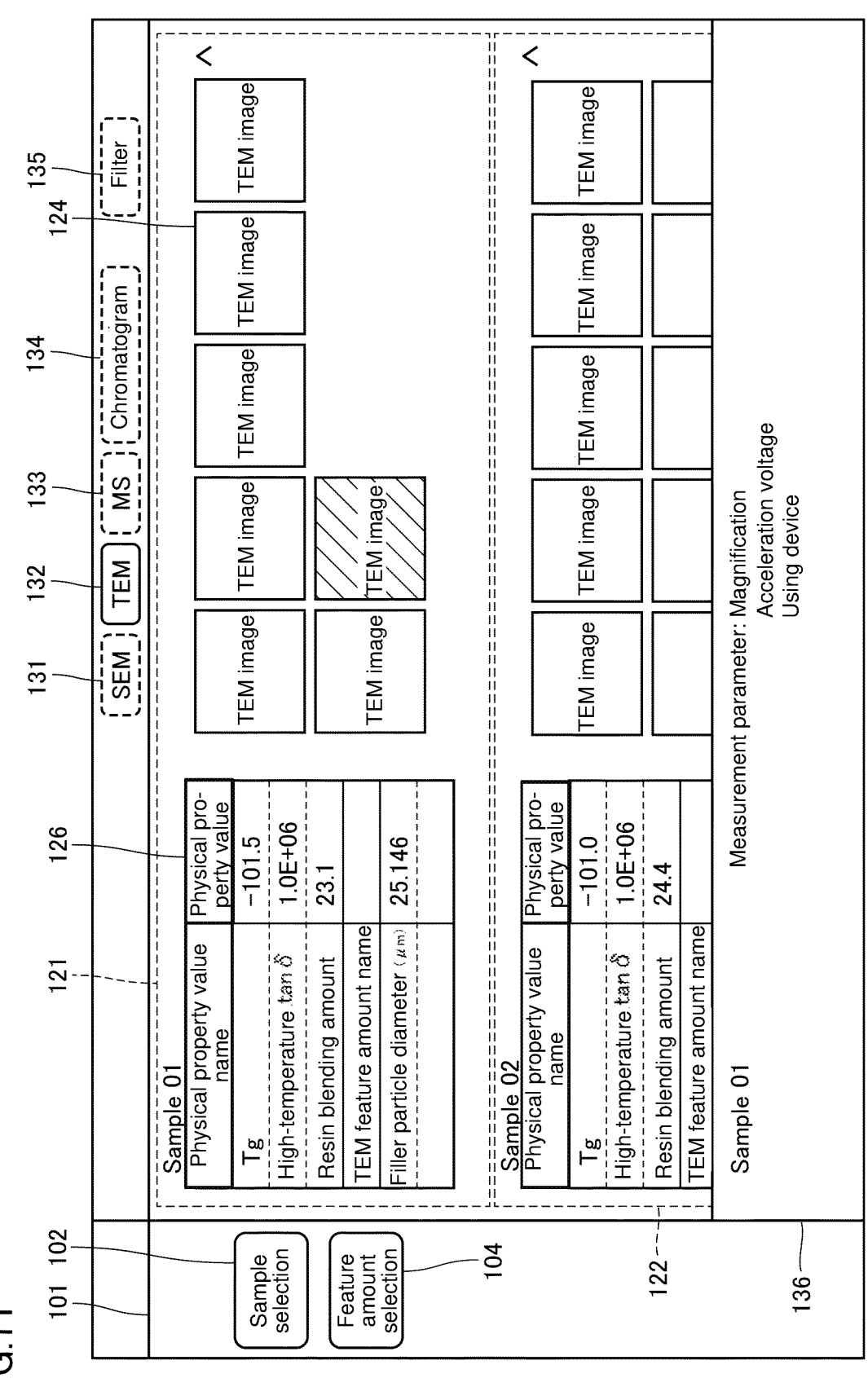
FIG. 11 is a diagram schematically showing a fifth display screen example of the viewer for analysis.

The fifth display screen example shown in FIG. 11 differs only in having a display area 136, compared with the second display screen example shown in FIG. 8. Therefore, the portion similar to the portion of the second display screen example will not be described repeatedly.

Referring to FIG. 11, in the display area 136 of the fifth display screen example, analysis conditions associated with the analysis data are displayed. Specifically, when one TEM image is selected from the plurality of TEM images 124 displayed on the display screen, analysis conditions associated with the selected TEM image are displayed in the display area 136. In the example of FIG. 11, it is assumed that one TEM image 124 is selected from a plurality of TEM images 124 of the sample named "Sample 01." In this instance, in the display area 136, measurement parameters for acquiring the selected TEM image 124 is displayed. In the example of FIG. 11, the acceleration voltage, the observation magnification, and the using device of the TEM are displayed.

(Sixth Display Screen Example)

The sixth display screen example shown in FIG. 12 differs from the first through fifth display screen examples in that it has display areas 140, 141, and 144 instead of the display areas 121 to 123. In the display area 140, the displays analysis data of the plurality of samples selected as display targets are displayed side by side. In the example of FIG. 12, a TEM image 124 of the sample named "Sample 01," a TEM image 124 of the sample named "Sample 02," and a TEM image 124 of a sample named "Sample 03" are displayed side by side. Note that in the TEM image 124 of each sample, the analysis conditions coincide with each other.

With this, it is easy to compare the same type of analysis data (TEM image) among a plurality of samples.

In the display area 141, a comparison table 142 of physical property values and feature amounts of the plurality of samples is displayed. In the comparison table 142, the physical property values and the feature amounts are shown adjacent to the TEM image 124 for each sample. This makes it easier to compare the physical property values and the feature amounts of the same type among a plurality of samples.

In the sixth display screen example, further, when the user selects one of sample TEM images 124 among the plurality of sample TEM images 124, cursors 125 are displayed at both left and right ends of the selected TEM image 124. FIG. 12 shows the case in which the sample TEM image 124 named "Sample 02" is selected. When the user clicks the cursor 125, the plurality of sample TEM images 124 can be scrolled in the left-right direction. It may be configured such that when the sample TEM image 124 of the sample named "Sample 02" is scrolled, the other sample TEM images are also scrolled to follow the sample TEM image 124.

Further, in the display area 144, the measurement parameters of the selected TEM image 124 are displayed. This allows the user to further view the other TEM images 124 for the interesting sample among the plurality of samples.

(Seventh Display Screen Example)

Figure 13:
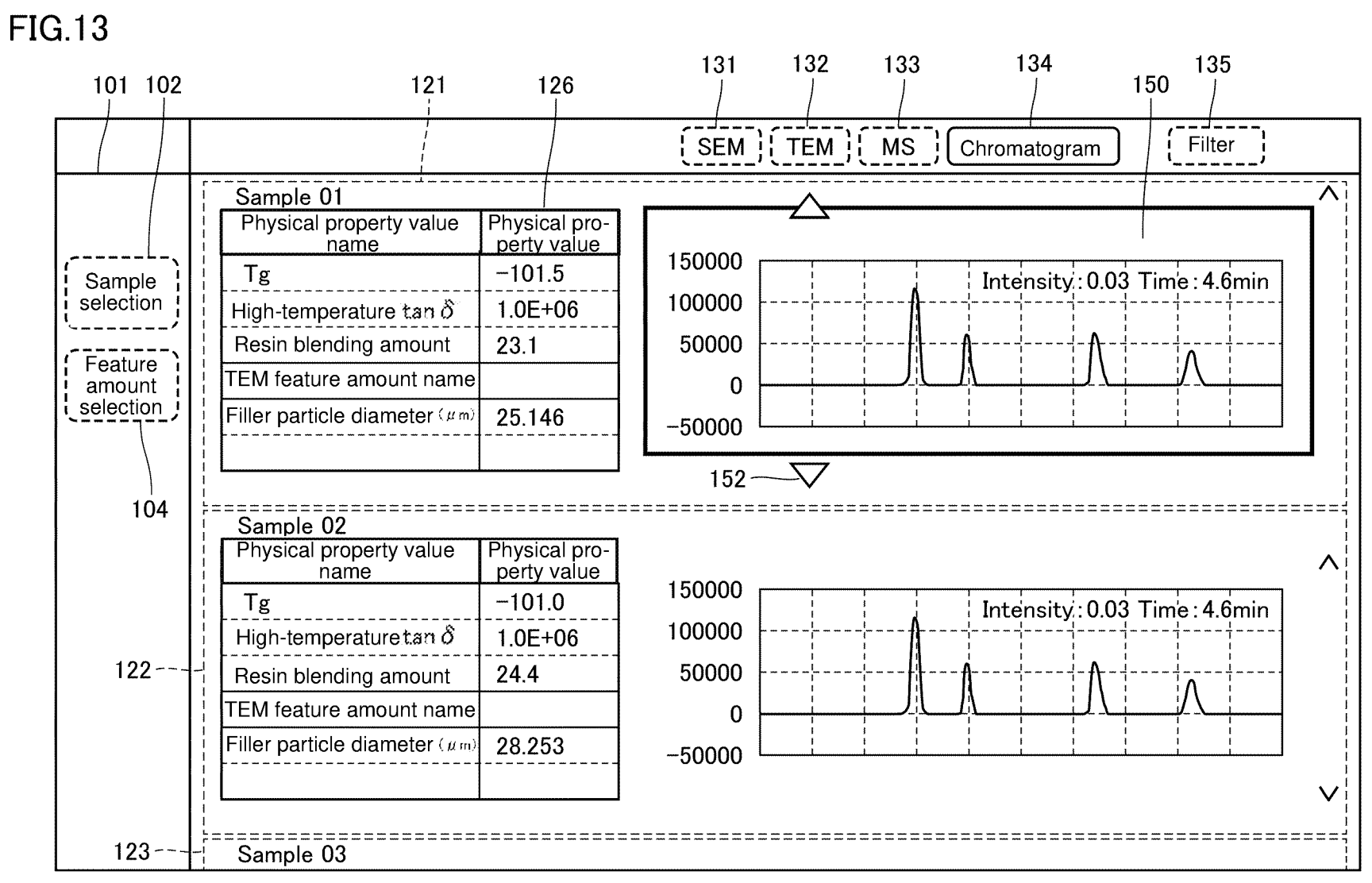

The seventh screen display example shown in FIG. 13 differs from the first display screen example shown in FIG. 1 in the type of analysis data to be displayed in the display area of each sample. Therefore, the portion similar to the portion of the first display screen example will not be described repeatedly.

In the first display screen example shown in FIG. 7, when the user clicks the icon 134, the display screen can be switched to the seventh display screen example shown in FIG. 13. Referring to FIG. 13, in the seventh display screen example, a chromatogram 150 is displayed in the display area 121 of the sample named "Sample 01." By clicking the cursor 152 arranged at both ends in the up-down direction of the chromatogram 150, the plurality of chromatograms 150 can be scrolled in the up-down direction. Analysis conditions, such as, e.g., the intensity (Intensity) and the time (Time), can be displayed together in each chromatogram. It may be configured such that when the cursor 152 in the display area 121 is clicked to scroll the chromatogram 150, the chromatograms displayed in the other display areas 122 and 123 are also scrolled to follow the chromatogram 150 in the display area 121.

As shown in the first and seventh display screen examples, the viewer 1 for analysis is configured such that a plurality of types of analysis data can be switched to be displayed for one sample. According to this configuration, the user can refer to a plurality of types of analysis data associated with one sample by a simple operation, and therefore, the analysis work can be performed efficiently.

Also in the seventh display screen example, similarly to the first display screen example, the display area 122 and the display area 123 have the same configuration as the display area 121. That is, in the display screen, analysis data (chromatogram) of the same type are displayed side by side for a plurality of samples as display targets. Thus, the user can compare the same type of analysis data among a plurality of samples.

(Eighth Display Screen Example)

Figure 14:
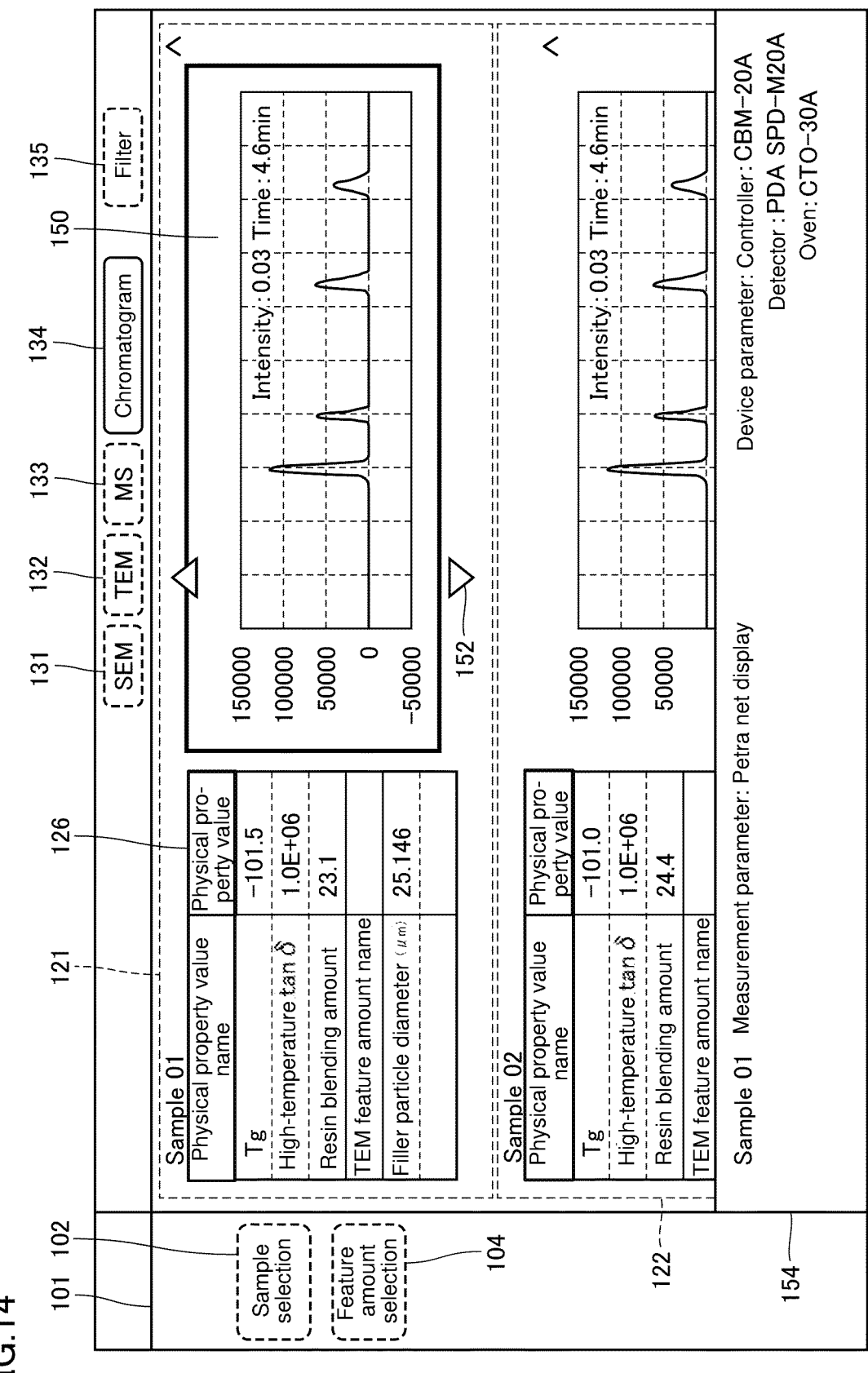
FIG. 14 is a diagram schematically showing an eighth display screen example of the viewer for analysis.

The eighth display screen example shown in FIG. 14 is derived from the seventh display screen example shown in FIG. 13. When the user performs an operation of selecting the chromatogram 150 shown in FIG. 13, as shown in FIG. 14, in the display area 154 of the display screen, the analysis conditions associated with the selected chromatogram 150 are displayed. In the example of FIG. 14, it is assumed that the chromatogram 150 of the sample named "Sample 01" is selected. In this instance, in the display area 154, the measurement parameters and the device parameters for acquiring the selected chromatogram 150 are displayed.

(Ninth Display Screen Example)

Figure 15:
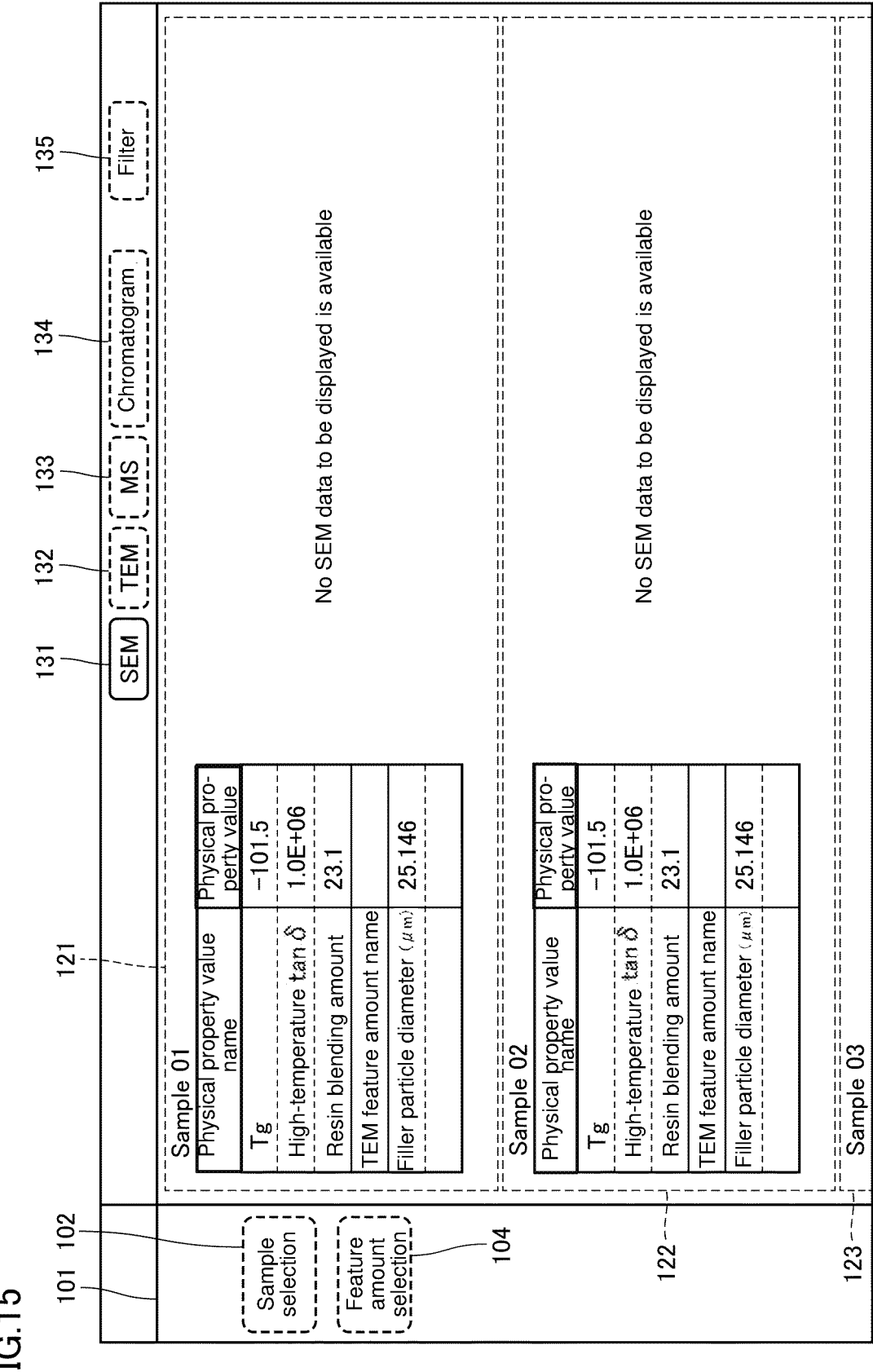
FIG. 15 is a diagram schematically showing a ninth display screen example of the viewer for analysis.

The ninth display screen example shown in FIG. 15 shows a display screen example in a case where there exist no data by the analyzer 4 selected as display target. In the example of FIG. 15, it is assumed that the sample named "Sample 01" and the sample named "Sample 02" are not analyzed by an SEM. In this situation, even if a SEM is included as the analyzer 4 to be displayed, there are no SEM image of these samples. Therefore, as shown in FIG. 15, in the display area 121, 122 of each sample, a message notifying that no SEM image to be displayed is available. For example, In the display area 121, 122, a message "No SEM data to be displayed is available" is displayed.

Returning to FIG. 4, the viewer 1 for analysis proceeds to Step S70 after displaying the display data on the display screen of the display unit 14 in Step S60 and determines whether or not the input unit 13 has received a user instruction for changing the display format. As described in the display screen example of FIG. 7 to FIG. 15, in the display screen, icons (e.g., cursors 125, 127, and 152, icons 131 to 134, and 135) for changing the display format are displayed. The user can switch the display format by clicking these icons.

When the input unit 13 accepts the user instruction for changing the display format (YES in S60), the viewer 1 for analysis returns to the process of Step S50 to change the display data in accordance with the user instruction. The viewer 1 for analysis displays the changed display data on the display screen of the display unit 14 in Step S60.

The viewer 1 for analysis also determines whether or not the input unit 13 has accepted a user instruction for changing the display target in Step S80. As described in the display screen examples of FIG. 7 to FIG. 15, the icons 102 and 104 for selecting the display target are displayed in the display screen. For example, in the first display screen example shown in FIG. 7, when the user clicks the icon 102, the display unit 14 switches from the display screen of FIG. 7 to the sample selection operation screen shown in FIG. 5. On the operation screen, the user can make a selection to change the sample to be displayed.

Further, in the first display screen example of FIG. 7, when the user clicks the icon 104, the display screen of FIG. 7 is switched to the feature amount selection operation screen shown in FIG. 6. The user can change the feature amounts and the physical property values to be displayed by performing a selection operation for changing the template 119 on the operation screen.

When the input unit 13 has accepted a user instruction (clicking of the icon 102, 104) for changing the display target (YES in S80), the viewer 1 for analysis returns to the process of Step S10 to display the operation screen in FIG. 5 or FIG. 6 on the display unit 14. Upon receipt of the user's selection, the viewer 1 for analysis executes the processing of Step S30 and S40 again to select the sample, the feature amounts, and the physical property values to be a displayed after the change. When the viewer 1 for analysis generates display data in Step S50, the viewer 1 of analysis displays the generated display data on the display screen of the display unit 14 in Step S60.

As described above, according to the viewer 1 for analysis of this embodiment, a plurality of analysis results associated with one sample can be displayed (see FIG. 7 and FIG. 13). This allows the user to compare and refer to a plurality of analysis results for one sample with a simple operation.

Further, according to the viewer 1 for analysis of this embodiment, the same type of analysis results can be displayed side by side for a plurality of samples (see FIG. 12). This allows the user to compare and refer to the same type of analysis results among a plurality of samples.

Further, according to the viewer 1 for analysis of this embodiment, attribute values (feature amounts and physical property values) of a sample can be displayed together with the analysis results for each sample (see FIG. 7 to FIG. 14). This allows the user to view the analysis results and the attribute values for each sample at the same time. In addition, the feature amounts can be compared between a plurality of samples.

Furthermore, according to the viewer 1 for analysis of this embodiment, the display format of the analysis results of each sample can be switched (see FIG. 7 to FIG. 10). Accordingly, the user can freely change the display format of the analysis results according to the analysis work contents.

Based on these benefits, the viewer 1 for analysis according to this embodiment can improve the convenience of a user who performs the analysis work of the analysis results by the plurality of analyzers. As a result, it is possible to facilitate the cross-sectional analysis of the analysis results by the plurality of analyzers, and therefore, it is possible to contribute to realize the efficient and highly accurate analysis.

Other Configuration Examples

(1) Browsing Restriction Function

In the embodiments described above, a configuration has been described in which a list of samples analyzed by the plurality of analyzers 4 is displayed on the sample operation screen (see FIG. 5), and the user selects a sample in which the analysis results are to be viewed. However, in the above-described configuration, it is possible to set a browsing restriction related to the analysis results for each user.

Such a browsing restriction can be set for each sample, for example, in the server 2 by the administrator of the display system 100. Alternatively, the analyst can set a browsing restriction for each sample in the analyzer 4. Therefore, the administrator or the analyst can conceal the analysis results according to the information-management necessity by setting a user who can browse the analysis results for each sample.

(2) Display Switching Function

In the above-described embodiment, a configuration has been described in which the analysis data to be displayed in the display area of each sample is collectively switched by the operating icon 131 to 134 arranged on the display screen (see FIG. 13). However, the viewer 1 for analysis may further include a configuration of switching the analysis data to be displayed in the display area individually for each sample. In this configuration, the viewer 1 for analysis may be configured to switch the analysis data to be displayed in the display area, for other samples to follow the analysis data.

(3) Display Target Selection Function

In the above-described embodiments, a configuration has been described in which in the feature amount selection operation screen (see FIG. 6), a template (feature amounts and physical property values) is selected commonly to the plurality of samples selected as the display target. However, it is also possible to further include a configuration in which a template is individually selected for the plurality of samples. Specifically, in the feature amount selection operation screen (see FIG. 6), the viewer 1 for analysis may be configured to include a mode in which a template (feature amounts and physical property values) for commonly selecting for a plurality of samples and a mode for individually selecting the template for a plurality of samples, and the mode is switched in accordance with the instruction from the user, According to this, the user can compare the analysis data, the feature amounts, and the physical property values of the same type among the plurality of samples by switching the mode. Further, for each sample, a plurality of types of analysis data, a plurality of types of feature amounts, and a plurality of types of physical property values can be compared.

Aspects

It will be understood by those skilled in the art that the plurality of exemplary embodiments described above are illustrative of the following aspects.

(Item 1)

A viewer for analysis according to one aspect of the present invention, includes:

a communication unit configured to receive analysis results for each of a plurality of samples, the analysis results being different in type from each other and outputted from a plurality of types of analyzers;

a display unit configured to display the analysis results received by the communication unit;

a control unit configured to control the display unit; and a first selection means configured to select at least two or more display target samples from the plurality of samples;

wherein the display unit includes:

a display area configured to display the analysis results by the plurality of types of analyzers, for each of the at least two or more display target samples; and a list display area configured to display at least two or more display areas in a list, the at least two or more display areas corresponding to the at least two or more display target samples.

According to the viewer for analysis as recited in the above-described Item 1, the user can compare and refer to the same type of samples among a plurality of analysis results because analysis results for at least two or more samples can be displayed side by side. Consequently, it is possible to facilitate the cross-sectional analysis of the analysis results by a plurality of types of analyzers.

(Item 2)

In the viewer for analysis as recited in the above-described Item 1, the control unit is configured to be capable of acquiring feature amounts and physical property values for each sample, the viewer for analysis further includes:

a second selection means configured to select display target feature amounts and physical property values, for the at least two or more display target samples selected by the first selection means.

The display area displays, for each display target sample, the feature amounts and the physical property values selected by the second selection means side alongside the analysis results.

According to the viewer for analysis as recited in the above-described Item 2, for each sample, the attribute values (feature amounts and physical property values) of the sample can be displayed together with the analysis results. Therefore, the user can simultaneously refer to the analysis results and the attribute values for each sample. In addition, the feature amounts can be compared between a plurality of samples.

(Item 3)

In the viewer for analysis as recited in the above-described Item 2, the feature amounts include attribute values of the sample extracted from the analysis results for each sample. The physical property values include attribute values of the sample acquired from information other than the analysis results for each sample.

According to the viewer for analysis as recited in the above-described Item 3, the user can simultaneously refer to the analysis results and the feature amounts and/or the physical property values for each sample. In addition, the feature amounts can be compared between a plurality of samples.

(Item 4)

In the viewer for analysis as recited in any one of the above-described Items 1 to 3, the second selection means selects the feature amounts and the physical property values common to the at least two or more display target samples.

According to the viewer for analysis as recited in the above-described Item 4, it is possible to improve the convenience of the user who performs the analysis work of the analysis results by the plurality of analyzers.

(Item 5)

In the viewer for analysis as recited in any one of the above-described Items 1 to 4, the display area displays icons for accepting a switching operation of a display of the analysis results, for each display target sample. The control unit switches the displays analysis results to be displayed based on the operation of the icons.

According to the viewer for analysis as recited in the above-described Item 5, the user can easily switch the display of the analysis result by operating the icon, and therefore, the convenience of the user who performs the analysis work of the analysis results by the plurality of types of analyzers can be improved.

(Item 6)

In the viewer for analysis as recited in the above-described Item 5, the control unit is configured to switch the display of the analysis results common to the at least two or more display target samples upon receipt of the operation of the icon for on display target sample out of the at least two or more display target samples.

According to the viewer for analysis as recited in the above-described Item 6, the user can switch the analysis results to be displayed for at least two or more samples collectively by operating the icon. Consequently, it is possible to improve the convenience of the user who performs the analysis work of the analysis results by the plurality of types of analyzers.

(Item 7)

A display system according to one aspect of the present invention includes:

the plurality of types of analyzers; and the viewer for analysis as recited in any one of the above-described Items 1 to 6.

According to display system according to the above-described Item 7, it is possible to facilitate the cross-sectional analysis of the analysis results by the plurality of analyzers.

(Item 8)

A display method according to one aspect of the present invention is a display method for displaying analysis results by a plurality of types of analyzers on a viewer for analysis, the analysis results being different in type from each other, the display method includes:

a step of receiving analysis results by the plurality of types of analyzers for each of a plurality of samples; and a step of displaying the received analysis results on the viewer for analysis, wherein the step of displaying the received analysis results includes:

a step of selecting at least two or more display target samples from the plurality of samples;

a step of displaying analysis results by the plurality of types of analyzers in a display area, for each of the at least two or more display target samples; and a step of displaying at least two or more of display areas in a list, the at least two or more of display areas corresponding to the at least two or more display target samples.

According to the display method as recited in the above-described Item 8, it is possible to facilitate the cross-sectional analysis of the analysis results by a plurality of types of analyzers.

(Item 9)

A display program according to one aspect of the present invention is a display program for displaying analysis results by a plurality of types of analyzers on a viewer for analysis, the analysis results being different in type from each other, the display program makes a computer execute:

a step of receiving analysis results by the plurality of types of analyzers, for each of a plurality of samples; and a step of displaying the received analysis results on the viewer for analysis, wherein the step of displaying the received analysis results includes:

a step of selecting at least two or more display target samples from the plurality of samples;

a step of displaying analysis results by the plurality of types of analyzers in a display area, for each of the at least two or more display target samples; and a step for displaying at least two or more of display areas in a list, the at least two or more of display areas corresponding to the at least two or more display target samples.

According to the display program as recited in the above-described Item 9, it is possible to facilitate the cross-sectional analysis of analysis results by the plurality of analyzers.

It should be noted that with respect to the above-described embodiments and modifications, it is planned from the time of filing the application that the configurations described in the embodiments are appropriately combined, including combinations not described in the specification, within a range in which disadvantage or inconsistency does not occur.

The embodiments and modifications disclosed herein are to be considered in all respects as illustrative and not restrictive. The scope of the present invention is indicated by the appended claims rather than by the foregoing descriptions, and is intended to include all modifications within the meanings and ranges equivalent to the claims.

DESCRIPTION OF SYMBOLS

1: Viewer for analysis
2: Server
3: Database
4: Analyzer
5: Device Main Body
6: Information processing device
7: Internet
10, 20, 60: CPU
11, 21, 61: ROM
12, 22, 62: RAM
13, 23, 63: Input unit
14, 64: Display unit
15, 25, 65: HDD
16, 26, 66: Communication I/F
17: Selection unit
18: Display data generation unit
19: Display control unit
24: I/O
27: Analysis result data acquisition unit
28: Physical property value acquisition unit
29: Composite unit
67: Analysis data acquisition unit
68: Feature amount extraction unit
69: Information acquisition unit
100: Display system
101, 110, 112, 114, 121-123, 136, 140, 141, 144, 154: Display area
102, 104, 113, 119, 129-135: Icon
124: TEM image
125, 127: Cursor
142: Comparison table
150: Chromatogram

The invention claimed is:

1. A viewer for analysis, comprising:
a communication interface configured to receive analysis results for each of a plurality of samples, the analysis results being different in type from each other and outputted from a plurality of types of analyzers;
a display configured to display the analysis results received by the communication interface;
a controller configured to control the display; and
a first selection means configured to select at least two display target samples from the plurality of samples,
wherein a display screen of the display includes at least two display areas set corresponding to the at least two display target samples, respectively,
wherein the at least two display areas are displayed side by side in the display screen,
wherein each of the at least two display areas includes a first area that is configured to display the analysis results for a corresponding display target sample by the plurality of types of analyzers with switching the analyzer in accordance with a selection operation by a user in a display format according to the type of the analysis result,
wherein the first area of the each of the at least two display areas simultaneously display the analysis results for the corresponding display target sample of the same type of the analysis result,
wherein the display screen displays icons for accepting the selection operation for each display target sample,
wherein the icons are configured to display types of analyzers that are used for analysis of the at least two display target samples, and wherein the controller is configured to switch the analyzer and display the analysis results in the first area common to the at least two display target samples upon receipt of the selection operation of the icon for one display target sample out of the at least two display target samples.

2. The viewer for analysis as recited in claim 1,
wherein the controller is configured to be capable of acquiring feature amounts and physical property values for each sample,
wherein the viewer for analysis further comprises a second selection means configured to select types of feature amounts and physical properties to be displayed, for the at least two display target samples selected by the first selection means; and
wherein each of the at least two display areas further includes a second area that is configured to display, for the corresponding display target sample, the feature amounts and the physical property values of the types selected by the second selection means.

3. The viewer for analysis as recited in claim 2,
wherein the feature amounts include attribute values of the sample extracted from the analysis results for each sample, and
wherein the physical property values include attribute values of the sample acquired from information other than the analysis results for each sample.

4. The viewer for analysis as recited in claim 2,
wherein the second selection means selects the types of the feature amounts and the physical property values common to the at least two display target samples.

5. A display system comprising:
the plurality of types of analyzers configured to output a plurality of analysis results different in type from each other; and
the viewer for analysis as recited in claim 1.

6. A display method for displaying analysis results by a plurality of types of analyzers on a viewer for analysis, the analysis results being different in type from each other, the display method comprising:
a step of receiving analysis result by the plurality of types of analyzers for each of a plurality of samples; and
a step of displaying the received analysis results on a display screen of the viewer for analysis,
wherein the step of displaying the received analysis results includes:
a step of selecting at least two display target samples from the plurality of samples;
a step of displaying the analysis results by the plurality of types of analyzers in a display area of the display screen, for each of the at least two display target samples with switching the analyzer in accordance with a selection operation by a user in a display format according to the type of the analysis result; and
a step of displaying at least two display areas side by side in the display screen, the at least two display areas corresponding to the at least two display target samples,
wherein the step of displaying the at least two display areas side by side in the display screen includes simultaneously displaying the analysis results for the corresponding display target sample of the same type of the analysis result and
wherein the display method further comprises:
a step of displaying, in the display screen, icons for accepting the selection operation for each display target sample, wherein the icons are configured to display types of analyzers that are used for analysis of the at least two display target samples; and a step of switching the analyzer and displaying the analysis results in a first area common to the at least two display target samples upon receipt of the selection operation of the icon for one display target sample out of the at least two display target samples.

7. A non-transitory computer readable medium storing a display program for displaying analysis results by a plurality of types of analyzers on a viewer for analysis, the analysis results being different in type from each other, the display program makes a computer execute:

a step of receiving analysis results by the plurality of types of analyzers, for each of a plurality of samples; and a step of displaying the received analysis results on a display screen of the viewer for analysis, wherein the step of displaying the received analysis results includes:

a step of selecting at least two display target samples from the plurality of samples;

a step of displaying analysis results by the plurality of types of analyzers in a display area of the display screen, for each of the at least two display target samples with switching the analyzer in accordance with a selection operation by a user in a display format according to the type of the analysis result; and a step of displaying at least two display areas side by side in the display screen, the at least two display areas corresponding to the at least two display target samples, wherein the step of displaying the at least two display areas side by side in the display screen includes simultaneously displaying the analysis results for the corresponding display target sample of the same type of the analysis result, and wherein the display program further makes the computer execute;

a step of displaying, in the display screen, icons for accepting the selection operation for each display target sample wherein the icons are configured to display types of analyzers that are used for analysis of the at least two display target samples, and a step of switching the analyzer and displaying the analysis results in a first area common to the at least two display target samples upon receipt of the selection operation of the icon for one display target sample out of the at least two display target samples.

* * * * *